United States Patent
Han et al.

(10) Patent No.: US 6,999,262 B2
(45) Date of Patent: Feb. 14, 2006

(54) SERVO TRACK WRITING FOR ULTRA-HIGH TPI DISK DRIVE IN LOW DENSITY MEDIUM CONDITION

(75) Inventors: Yun-Sik Han, Santa Clara, CA (US); Seong-Woo Kang, San Jose, CA (US); Tho Pham, Milpitas, CA (US); Young-Hoon Kim, Santa Clara, CA (US); Edward Aguilar, San Jose, CA (US); Dong-Ho Oh, San Jose, CA (US); Myeong-Eop Kim, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 43 days.

(21) Appl. No.: 10/732,999

(22) Filed: Dec. 10, 2003

(65) Prior Publication Data

US 2005/0128628 A1    Jun. 16, 2005

(51) Int. Cl.
*G11B 21/02* (2006.01)
(52) U.S. Cl. .................................................... 360/75
(58) Field of Classification Search ................ 360/75
See application file for complete search history.

(56) References Cited

U.S. PATENT DOCUMENTS 6,785,082 B1 *  8/2004  Fiorvanti et al. ............. 360/75
6,862,802 B1 *  3/2005  Cruz et al. .................... 29/737

* cited by examiner

*Primary Examiner*—David Hudspeth
*Assistant Examiner*—Mitchell Slavitt
(74) *Attorney, Agent, or Firm*—Ben J. Yorks; Jeffrey P. Aiello; Irell & Manella LLP

(57) ABSTRACT

A servo writer that writes servo information onto a disk of a hard disk drive. The servo writer can write servo information onto a disk of a hard disk drive while the disk is within an inner chamber of a housing. The rotating disk creates a flow of fluid within the inner chamber. The disk is rotated during the servo writing process. The density of a fluid medium within the inner chamber is controlled by a medium control system so that the density of the medium is less than the density of air at one atmosphere. Lowering the density decreases the amplitude of vibrational forces created by the flow of fluid. Decreasing the amplitude reduces errors in the servo writing process. The density can be reduced by pulling a vacuum within the inner chamber. The density can also be reduced by filling the inner chamber with a gas such as helium that has a lower density than air.

13 Claims, 4 Drawing Sheets

SERVO TRACK WRITING FOR ULTRA-HIGH TPI DISK DRIVE IN LOW DENSITY MEDIUM CONDITION

BACKGROUND OF THE INVENTION

1. Field of the Invention

The present invention relates to a method for writing servo onto a disk of a hard disk drive.

2. Background Information

Hard disk drives contain a plurality of magnetic heads that are coupled to rotating disks. The heads can magnetize and sense the magnetic fields of the disk to write and read data, respectively. The heads are coupled to a pivoting actuator arm that has a voice coil motor.

Data is typically stored on tracks that extend radially across the disk surfaces. The voice coil motor can be energized to pivot the actuator arm and move the heads to different track locations. Each track is typically divided into a number of sectors. Each sector contains at least one data field.

To accurately locate the heads relative to the disk tracks, each track contains a plurality of servo fields. Each servo field typically contains a plurality of servo bits that are read to create a position error signal ("PES"). The PES is used in a servo routine to center the heads relative to the centerlines of the tracks. It is desirable to write data when the heads are located on the center of the tracks so that the writing process does not corrupt data on adjacent tracks.

The servo bits are typically written as part of the manufacturing process of the drive. There are various techniques for writing servo onto the disks. For example, some manufacturers use a dedicated servo writer machine that is located in a clean room. The servo writer may have a spindle motor and a separate head assembly. Disks are loaded onto the spindle motor and the head assembly writes the servo information directly to the disk surfaces. The spindle motor rotates the disks during the servo writing process.

After the servo writing process is completed the disks are unloaded from the spindle and assembled into a hard disk drive. Alternatively, some servo writers are configured to write onto the disk surfaces after the disks are assembled into a drive assembly. The spindle motor of the drive assembly rotates the disks during the servo writing routine.

Rotation of the disks creates a flow of air across the disk surfaces. The air flow cooperates with air bearing surfaces of the heads to create air bearings between the heads and surfaces of the disks. The air bearings prevent excessive mechanical wear between the heads and the disks.

Unfortunately, the flow of air also creates a mechanical vibration within the disk drive. The vibration can cause undesirable movement of the heads relative to the disk. Such movement of the heads during a servo writing routine may create repeatable run-out ("RRO") and non-repeatable run-out errors ("NRRO") in the servo PES. The errors may increase the seek and access times required to read and write data onto the disks. It would be desirable to reduce the vibration induced errors created by the flow of air during a servo writing routine.

BRIEF SUMMARY OF THE INVENTION

A servo writer that writes servo information onto a disk of a hard disk drive. The servo writer includes a housing with an inner chamber that can receive the disk. A circuit of the servo writer causes servo information to be written onto the disk. The servo writer also includes a medium control system that creates a fluid medium density within the inner chamber that is less than a density of air at one atmosphere.

DETAILED DESCRIPTION

Disclosed is a servo writer that writes servo information onto a disk of a hard disk drive. The servo writer can write servo information onto a disk of a hard disk drive while the disk is within an inner chamber of a housing. The disk is rotated during the servo writing process. The rotating disk creates a flow of fluid within the inner chamber. The density of a fluid medium within the inner chamber is controlled by a medium control system so that the density of the medium is less than the density of air at one atmosphere. Lowering the density decreases the amplitude of vibrational forces created by the flow of fluid. Decreasing the amplitude reduces errors in the servo writing process. The density can be reduced by pulling a vacuum within the inner chamber. The density can also be reduced by filling the inner chamber with a gas such as helium that has a lower density than air.

Figure 1:
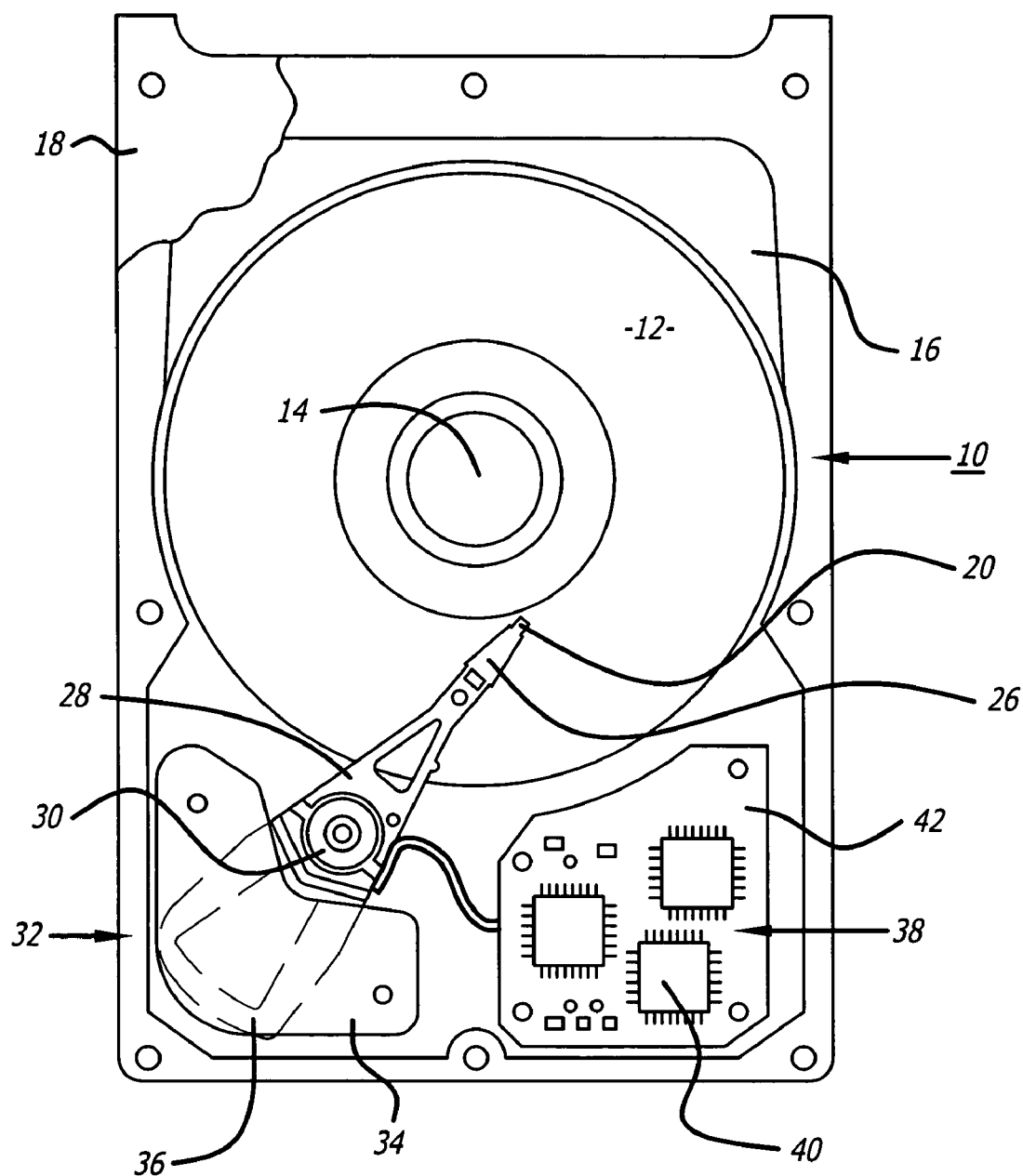
FIG. 1 is a top view of an embodiment of a hard disk drive.

Referring to the drawings more particularly by reference numbers, FIG. 1 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. Each head 20 may have separate write (not shown) and read elements (not shown). The heads 20 are gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 2:
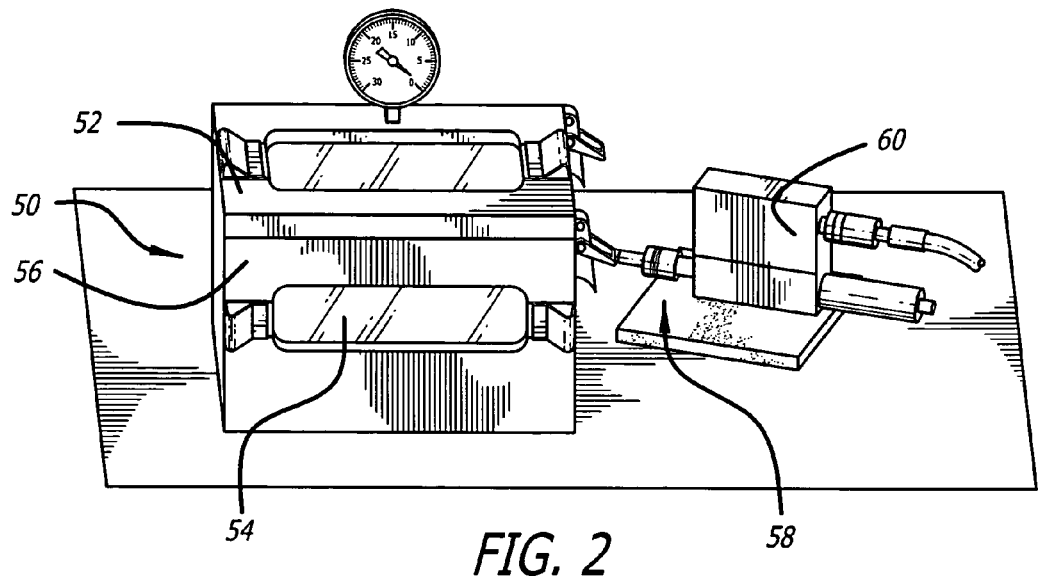
FIG. 2 is a perspective view of a servo writer.

FIG. 2 shows an embodiment of a servo writer system 50. The system 50 may include a housing 52 that has an inner chamber 54. The housing 52 has a door 56 to allow a disk or a hard disk drive (not shown) to be placed into the inner chamber 54. The inner chamber 54 may be coupled to a medium control system 58. The medium control system 58 controls the density of the fluid medium within the inner chamber 54 to be less than the density of air at one atmosphere. The lower density reduces fluid induced vibrations during the servo writing process.

The control system 58 may include a pump 60 that is coupled to the inner chamber 54 of the housing 52. The pump 60 can create a vacuum pressure within the inner chamber 54 by pulling air out of the chamber 54. The vacuum pressure is maintained within the inner chamber 54 during the servo writing process. By way of example, the pump may create a vacuum pressure with a range between 3–25 inches of mercury (In—HgA). Pulling a vacuum reduces the density of the air within the inner chamber 54. Instead of the pump 60 the inner chamber 54 may be coupled to a vacuum line of the building.

Figure 3:
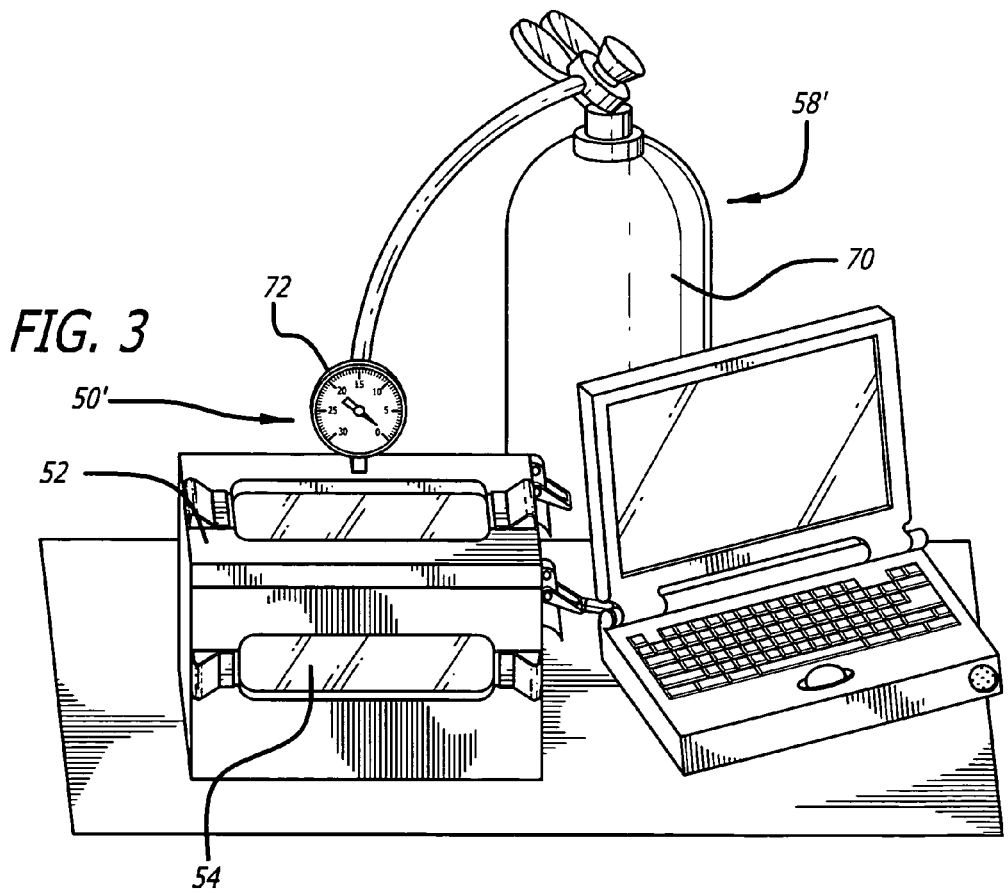
FIG. 3 is a perspective view of an alternate embodiment of the servo writer.

FIG. 3 shows an alternate embodiment of a servo writer system 50' that includes a helium tank 70 of a medium control system 58'. The inner chamber 54 of the housing 52 may be filled with helium from the tank 70. Helium has a density less than the density of air. Consequently, the helium will create lower vibration amplitudes and reduce errors in the servo writing process. The tank 70 can be used with or without a pump (not shown). A pump may be included to evacuate the inner chamber 54 before the helium is introduced to the chamber 54. The tank 70 may be coupled to the housing 52 by a regulator valve 72 that regulates the pressure within the inner chamber 54.

Figure 4:
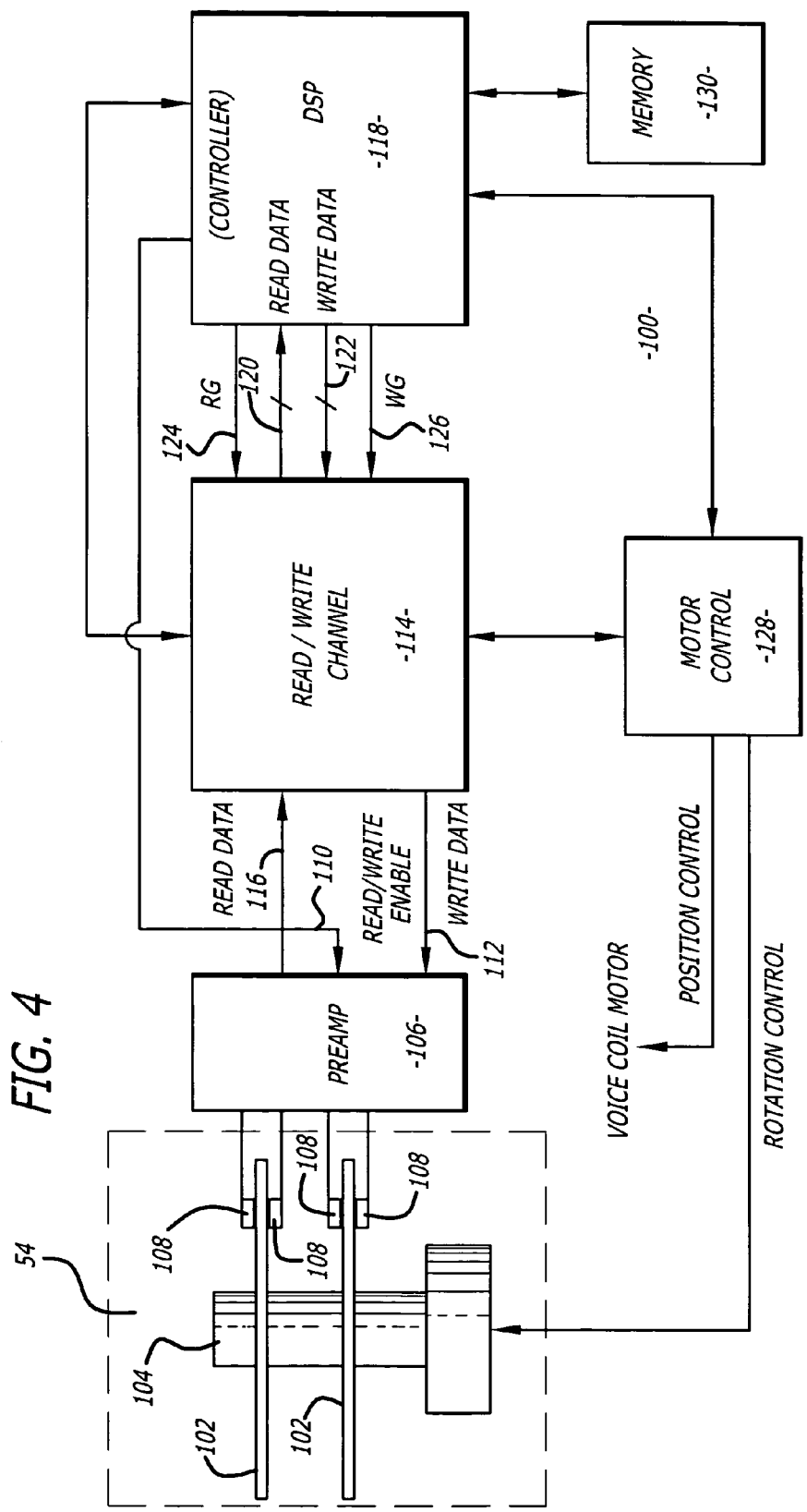
FIG. 4 is a schematic of an electrical circuit for a circuit that can cause servo to be written onto a disk.

FIG. 4 shows a circuit 100 that can be used to write servo information onto one or more disks 102. The disks 102 may be loaded onto a spindle 104 that is located within the inner chamber of the servo writer housing. The spindle 104 rotates the disks 102. The circuit 100 may include a pre-amplifier circuit 106 that is coupled to a plurality of heads 108. The heads 108 are magnetically coupled to the disks 102. The pre-amplifier circuit 106 has a read data channel 110 and a write data channel 112 that are connected to a read/write channel circuit 114. The pre-amplifier 106 also has a read/write enable gate 116 connected to a controller 118. Data can be written onto the disks 102, or read from the disks 102 by enabling the read/write enable gate 116.

The read/write channel circuit 114 is connected to a controller 118 through read and write channels 120 and 122, respectively, and read and write gates 124 and 126, respectively. The read gate 120 is enabled when data is read from the disks 102. The write gate 126 is enabled when writing data to the disks 102. The controller 118 may be a digital signal processor that operates in accordance with a software routine, including a routine(s) to write servo information onto the disks 102. The read/write channel circuit 114 and controller 118 may also be connected to a motor control circuit 128 that controls a voice coil motor (not shown) and the spindle 104. The voice coil motor can move the heads 108 relative to the disks 102. The controller 122 may be connected to a non-volatile memory device 130. By way of example, the device 126 may be a read only memory ("ROM"). The memory device 130 may contain instructions, including servo writing instruction operated by the controller 118 to write servo bits onto the disks 102.

In operation, an operator may load the disks 102 onto the spindle 104 and then actuate the medium control system 58 to reduce the density within the inner chamber 54 of the housing 52. The circuit 100 then writes servo information onto the disks 102 through the heads 108. The disks 102 are then unloaded from the spindle 104 and eventually assembled into a hard disk drive.

Figure 5:
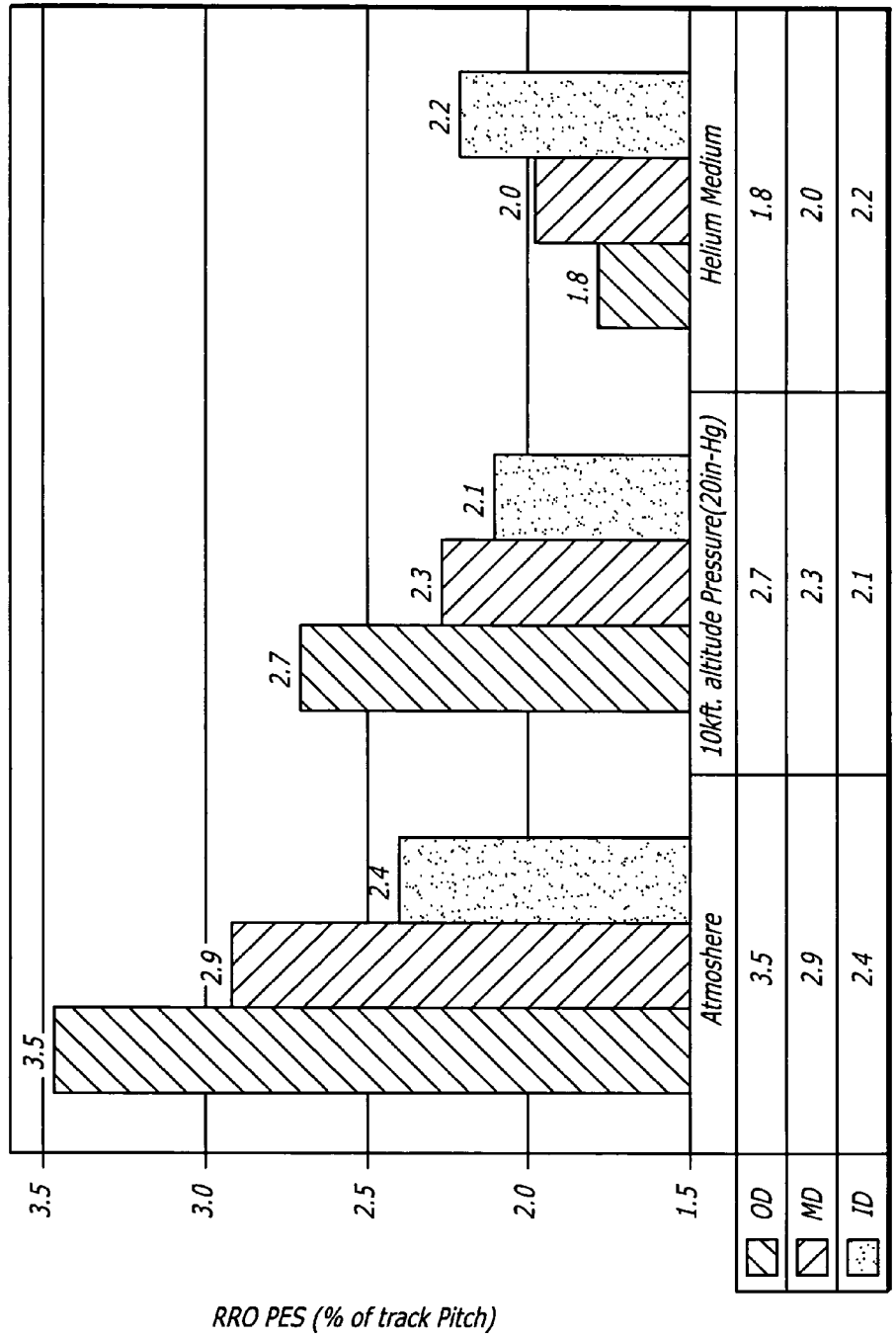
FIG. 5 is a graph comparing repeatable run-out error for disk drives containing servo written in air at one atmosphere, air at less than one atmosphere, and helium.

FIG. 5 shows a comparison of repeatable run-out ("RRO") PES for a disk drive written with servo at atmosphere, in air at 20 in-Hg vacuum and a helium medium. As shown the reduction in fluid density during the servo writing process reduces the RRO PES.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Although a servo writer with a spindle 104 is shown and described, it is to be understood that the writer system may write servo onto the disks after the disks are assembled into a hard disk assembly. The writer system could have an electrical connector located within the housing inner chamber that connects to the external connector of the disk drive. The writer system can then cause the drive to write servo information onto the disks with the heads of the drive. Additionally, the housing may, or may not, be located within a clean room. In general servo track writing ("STW") techniques, such as conventional STW, media-level STW, full self-STW, semi-self or seeded STW, or hybrid STW can be employed using a medium control system that creates a fluid medium density less than the density of air at one atmosphere.

What is claimed is:

1. A servo writer for writing servo information onto a disk of a hard disk drive, comprising:
    a housing with an inner chamber that can receive the disk of the hard disk drive;
    a circuit that writes servo information onto the disk;
    a medium control system that is coupled to said inner chamber to create a fluid medium density within said inner chamber to be less than a density of air at one atmosphere; and,
    a pump to maintain a pressure of said inner chamber below one atmosphere.

2. The servo writer of claim 1, wherein said medium control system includes a source of helium that fills said inner chamber with helium.

3. The servo writer of claim 1, further comprising a spindle located within said inner chamber.

4. The servo writer of claim 1, wherein said housing is located within a clean room.

5. A servo writer for writing servo information onto a disk of a hard disk drive, comprising:
    a housing with an inner chamber that can receive the disk of the hard disk drive;
    a circuit that writes servo information onto the disk; and,
    medium control means for creating a fluid medium density within said inner chamber to be less than a density of air at atmospheric pressure, said medium control means includes a pump to maintain a pressure of said inner chamber below one atmosphere.

6. The servo writer of claim 5, wherein said medium control means includes a source of helium that fills said inner chamber with helium.

7. The servo writer of claim 5, further comprising a spindle located within said inner chamber.

8. The servo writer of claim 5, wherein said housing is located within a clean room.

9. A method for writing servo information onto a disk of a hard disk drive, comprising:
    placing a disk into a inner chamber of a housing;
    pulling a vacuum within the inner chamber with a pump, so that a density of a fluid medium in the inner chamber is less than a density of air at one atmosphere; and,
    writing servo information onto the disk.

10. The method of claim 9, wherein the condition is created by filling the inner chamber with helium.

11. The method of claim 9, wherein the disk is loaded onto a spindle located within the inner chamber.

12. The method of claim 9, wherein the housing is located within a clean room.

13. The method of claim 9, wherein a hard disk drive that contains the disk is placed into the inner chamber.

* * * * *